DAVID DALZELL.
Improvement in Lubricating Axle-Nuts.
No. 127,313.
Patented May 28, 1872.
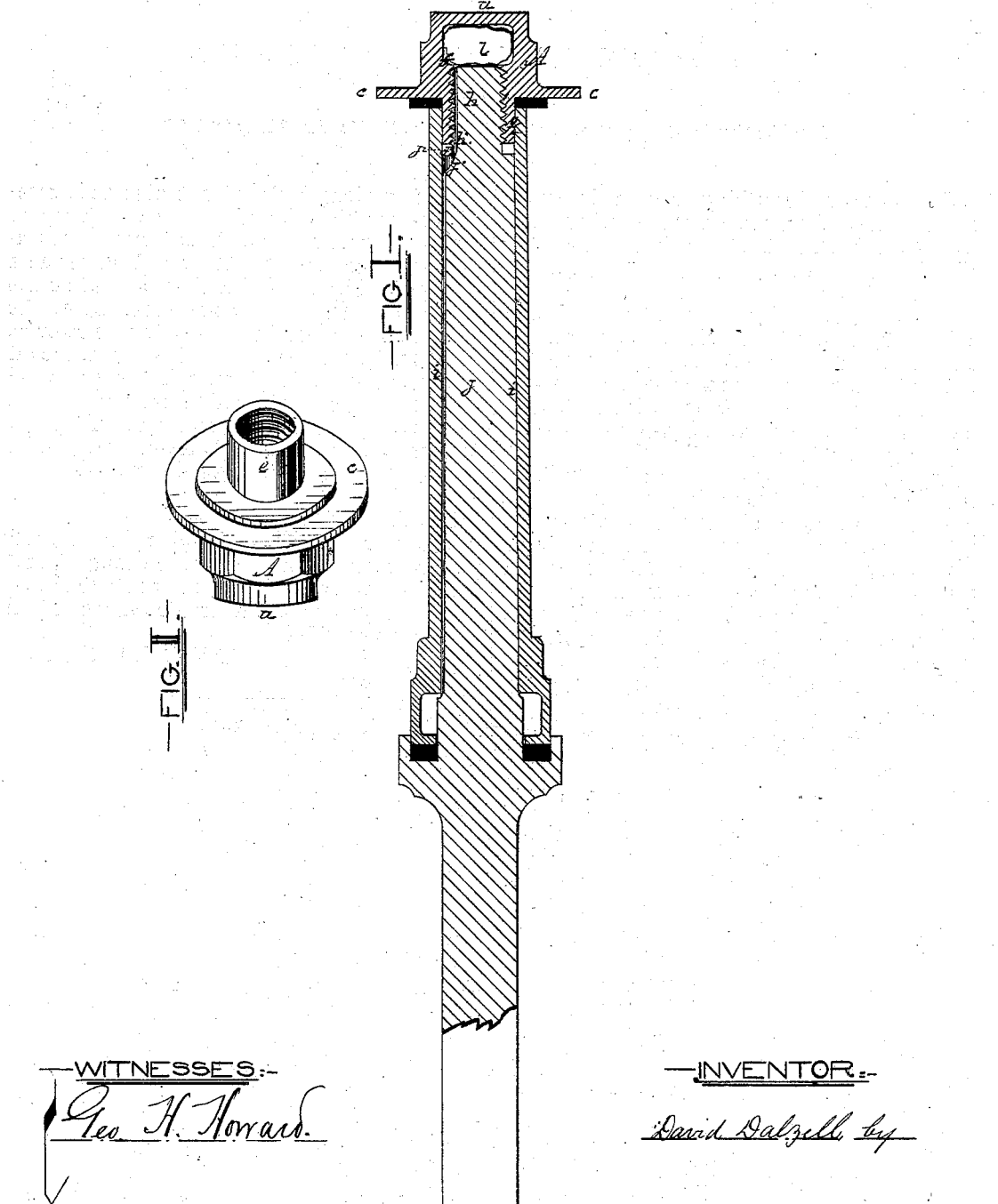

127,313

UNITED STATES PATENT OFFICE.

DAVID DALZELL, OF SOUTH EGREMONT, MASSACHUSETTS.

IMPROVEMENT IN LUBRICATING AXLE-NUTS.

Specification forming part of Letters Patent No. 127,313, dated May 28, 1872.

Specification describing certain Improvements in Axle-Nuts and Lubricators, invented by DAVID DALZELL, of South Egremont, in the county of Berkshire and State of Massachusetts.

This invention relates to a nut, formed with an oil-chamber and provided with a tapped tube, in combination with a sponge placed inside the nut, and with an axle whose threaded end is screwed into the tube and is also externally grooved crosswise of the thread to form a passage for the flow of oil.

Figure 1 is a longitudinal central section. Fig. 2 is a perspective view of the nut.

A is the nut aforesaid, the same being cast solid with a cap, $a$, on its outer side, and with a flange, $c$, on its inner side, and with a tapped tube, $e$, projecting from the flange. The nut A has an oil-chamber, $f$, which is continuous with the bore of the tube $e$. The thread of the tube enables it to be screwed upon the threaded end $h$ of the axle $j$ after the box $i$ is placed on the axle. The nut A then serves to hold the axle and box together. The end $h$ has a groove, $h'$, running lengthwise of one side and crosswise of the thread, and in the shoulder $j^1$ of the axle $j$ is a notch, $j^2$, which forms an extension of the groove $h'$. The end $h$ serves as a stopper to the oil-chamber $f$, so that, when the wheel is at rest, no oil escapes therefrom. As soon as the wheel begins to move, however, the heat generated by friction draws the oil out of the chamber $f$ through the groove $h^1$ and notch $j^2$, and the oil thereupon spreads itself evenly over the axle and box. A sponge, $l$, is inserted in the end of the chamber $f$, next the cap $a$, to serve as a regulator of the flow of oil.

I claim as my invention—

The nut $a$, having the chamber $f$ and tapped tube $e$, in combination with the sponge $l$, and the axle $j$, whose end $h$ enters within the tube, and has a groove, $h'$, running crosswise of its thread, as specified.

DAVID DALZELL.

Witnesses:
    GEO. E. BROWN,
    R. H. WHITTLESEY.